United States Patent
El Roz et al.

(10) Patent No.: US 11,739,105 B2
(45) Date of Patent: Aug. 29, 2023

(54) PHOTOINITIATORS MADE FROM BIFUNCTIONAL SILANE

(71) Applicants: Centre national de la recherche scientifique, Paris (FR); UNIVERSITE DE CAEN NORMANDIE, Caen (FR)

(72) Inventors: Mohamad El Roz, Herouville Saint-Clair (FR); Sami Lakhdar, Caen (FR); Igor Telegeiev, Herouville Saint-Clair (FR)

(73) Assignees: CENTRE NATIONAL DE LA RECHERCHE SCIENTIFIQUE, Paris (FR); UNIVERSITE DE CAEN NORMANDIE, Caen (FR)

( * ) Notice: Subject to any disclaimer, the term of this patent is extended or adjusted under 35 U.S.C. 154(b) by 626 days.

(21) Appl. No.: 16/764,805

(22) PCT Filed: Nov. 16, 2018

(86) PCT No.: PCT/EP2018/081631
§ 371 (c)(1),
(2) Date: Oct. 1, 2020

(87) PCT Pub. No.: WO2019/097021
PCT Pub. Date: May 23, 2019

(65) Prior Publication Data
US 2021/0024551 A1    Jan. 28, 2021

(30) Foreign Application Priority Data

Nov. 16, 2017 (FR) ........................ 1760796

(51) Int. Cl.
| | | |
|---|---|---|
| *C07F 7/18* | (2006.01) | |
| *C08F 222/10* | (2006.01) | |
| *C08F 2/50* | (2006.01) | |
| *C08F 216/16* | (2006.01) | |

(52) U.S. Cl.
CPC .......... *C07F 7/1804* (2013.01); *C07F 7/1876* (2013.01); *C08F 2/50* (2013.01); *C08F 216/16* (2013.01); *C08F 222/103* (2020.02); *C07B 2200/11* (2013.01)

(58) Field of Classification Search
None
See application file for complete search history.

(56) References Cited

U.S. PATENT DOCUMENTS 2,989,559 A * 6/1961 Marsden ................ C08G 77/38
252/589
5,776,658 A   7/1998 Niesert et al.
7,259,122 B1 * 8/2007 Lombardi ............... B01J 35/004
502/103
8,481,446 B2 * 7/2013 Lombardi ............ B01J 37/0219
556/427
8,921,243 B2 * 12/2014 Lombardi ................ B01J 31/38
502/158

OTHER PUBLICATIONS

Krawczyk et al. Synthesis and evaluation of new radical photoinitiators bearing trialkoxysilyl groups for surface immobilization. Polymer, vol. 129, 2017, pp. 207-220. (Year: 2017).*
International Search Report dated Jan. 25, 2019 in International Search Report PCT/EP2018/081631.

* cited by examiner

*Primary Examiner* — Sanza L. McClendon
(74) *Attorney, Agent, or Firm* — B. Aaron Schulman, Esq.; Stites & Harbison, PLLC

(57) ABSTRACT

The present invention relates to a compound of formula (I) below:

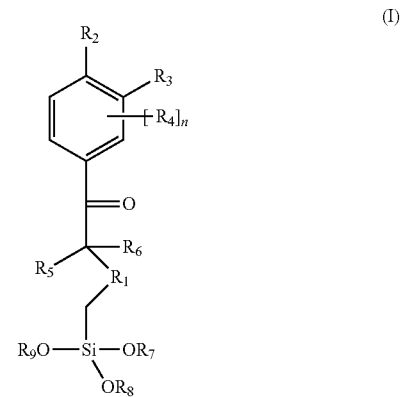

(I)

in which:

$R_1$ represents, in particular, an alkylene group comprising from 1 to 6 carbon atoms;

$R_2$ and $R_3$ are, in particular, H;

n is 0, 1, 2 or 3; and $R_4$ is chosen from the group consisting of: $NO_2$, $OR_a$, $SR_a$ and $NR_aR_b$, wherein $R_a$ and $R_b$ are as defined above;

$R_5$ and $R_6$, identical or different, represent an alkyl or alkoxy group comprising from 1 to 6 carbon atoms; and $R_7$, $R_8$ and $R_9$, identical or different, represent an alkyl group comprising from 2 to 6 carbon atoms.

14 Claims, 9 Drawing Sheets

PHOTOINITIATORS MADE FROM BIFUNCTIONAL SILANE

The present invention relates to novel photoinitiators based on bifunctional silane, as well as their preparation process. It also relates to their use for the preparation of hybrid polymer/filler materials via photopolymerization.

The incorporation of mineral fillers in polymers has become a very common industrial practice. These compounds are often essential, so as to give hybrid materials mechanical (impact resistance, abrasion resistance, attachment to wet surfaces, etc.), chemical (anticorrosion, anti-UV, etc.), or optical (opacity, color) properties. Silica nanoparticles (precipitated silica) are the used most often as fillers for the reinforcement of organic polymers. These materials are becoming essential in several industrial fields. In view of the hydrophilic nature of these materials and the hydrophobic nature of the polymers, it is not possible to use them directly as a filler in their raw state.

This problem is solved by the use of bifunctional silanes as coupling agents, so as to modify the hydrophilic nature of the silica particles and to ensure a chemical bond between these nanoparticles and the polymers, thanks to the ethoxysiloxane group which promotes the grafting of silane on the surface of the silica, and thanks to the sulfur group which ensures the modified silica/polymer coupling during the vulcanization reaction of polymer at high temperature (170° C.).

Unfortunately, the structures of commercial silanes are not compatible with certain polymerization systems which require moderate polymerization temperatures (close to ambient temperature), or with certain applications which require the absence of sulfur, which is the case for photopolymerization which is a booming technology.

The photopolymerization process consists in converting the liquid monomer into an insoluble polymer at room temperature under light irradiation. The light emitted is often located in the ultraviolet (or visible) region of the electromagnetic spectrum, which reacts with light-sensitive compounds, called "photoinitiators", so as to create free radicals at room temperature. These radicals can initiate the polymerization of formulated mixtures of oligomers, monomers and other components such as pigments, diluents, etc., so as to form rigid crosslinked polymers. Accordingly, photopolymerization is now considered to be one of the best choices in medical applications where low temperatures are maintained for the manufacture of medical devices. The absence of heat generation in the UV curing process prevents degradation of the lubricant coatings on guidewires and balloon catheters.

The object of the present invention is to provide a compound of the bifunctional silane type offering improved effectiveness compared to the compounds known to date, and, furthermore, being non-selective with respect to the monomer used.

The object of the present invention is to provide a compound of the bifunctional silane type, the structure of which does not need to be adapted or modified according to the monomer used.

The object of the present invention is to provide a compound of the bifunctional silane type that makes it possible to prepare hybrid polymer/filler materials with a chemical bond between the polymer and the organic filler.

Unlike conventional systems, the present invention also aims to provide a compound of the bifunctional silane type which is effective both for bulk and solution photopolymerization.

The present invention also aims to provide a compound of the bifunctional silane type which may be used as a photoinitiator for the preparation of polymers by photopolymerization in the absence of an external photoinitiator.

Thus, the present invention relates to a compound of formula (I) below:

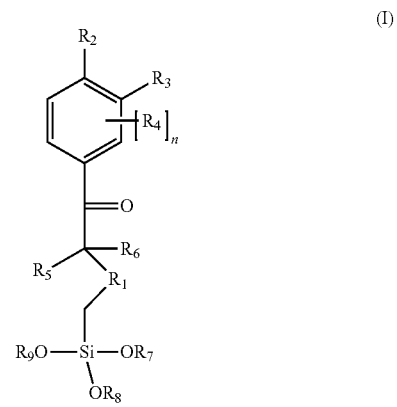

in which:

$R_1$ represents an alkylene group comprising from 1 to 6 carbon atoms or an —O-alkylene group comprising from 1 to 6 carbon atoms;

$R_2$ and $R_3$, identical or different, are chosen from the group consisting of: H, $NO_2$, $OR_a$, $SR_a$ and $NR_aR_b$, wherein $R_a$ and $R_b$, identical or different, represent H or an alkyl group comprising from 1 to 6 carbon atoms, or $R_2$ and $R_3$ may together form a phenyl group with the carbon atoms carrying them;

n is 0, 1, 2 or 3;

$R_4$ is chosen from the group consisting of: $NO_2$, $OR_a$, $SR_a$ and $NR_aR_b$, wherein $R_a$ and $R_b$ are as defined above;

$R_5$ and $R_6$, identical or different, represent an alkyl group comprising from 1 to 6 carbon atoms, or an alkoxy group comprising from 1 to 6 carbon atoms; and $R_7$, $R_8$ and $R_9$, identical or different, represent a carbon alkyl group or an alkoxy group comprising from 2 to 6 carbon atoms.

As described below, the compound according to the invention provides a more effective polymer/filler coupling that is easy to synthesize and offers the possibility of scaling-up.

In addition, the compound of the invention is non-selective and, therefore, makes it possible to solve the problem of selectivity with respect to the monomer that is present in certain conventional systems, while offering a significant improvement in the mechanical and chemical properties of the final product thanks to a favored chemical bond between the mineral filler and the polymer. The mechanical hardness of the composite is much higher than that of the pure polymer, or of a polymer prepared with the ungrafted silica. Unlike similar products where the silane function is grafted onto the benzoyl group, in the compound according to the invention, the silane function is grafted onto the other part of the compound, which allows, on the one hand, hanging the most effective radical on the surface, while, on the other hand, functionalizing the benzoyl group with other chromophores to obtain compounds with different UV-visible absorbance spectra.

Finally, this compound presents no toxicity.

The compounds according to the invention constitute a new generation of photoinitiators used for the manufacture of hybrid polymer/filler materials with improved properties, as explained below.

A compound according to the invention consists of a bifunctional silane synthesized in two steps, as described below.

According to the present invention, an alkyl group is a saturated, linear or branched aliphatic hydrocarbon group comprising, unless otherwise stated, from 1 to 6 carbon atoms. By way of examples, mention may be made of methyl, ethyl, n-propyl, isopropyl, butyl, isobutyl, tert-butyl or pentyl groups.

According to the present invention, an alkoxy group is an —O-alkyl radical in which the alkyl group is as defined above. By way of examples, mention may be made of —O—($C_1$-$C_4$) alkyl groups, and, in particular, the —O-methyl group, the —O-ethyl group, as the —O—$C_3$alkyl group, the —O-propyl group, —O-isopropyl, and as the —O—$C_4$alkyl group, the group —O-butyl, —O-isobutyl, —O-tertbutyl.

According to the invention, the term "alkylene" denotes a divalent radical comprising, unless otherwise stated, from 1 to 6 carbon atoms, and corresponding to an alkyl group from which a hydrogen atom has been removed. This radical may be represented, for example, by the formula $(CH_2)_n$, in which n is an integer varying from 1 to 6.

Preferably, in the above-mentioned formula (I), n=0. According to this embodiment, the compound of the invention does not include a substituent $R_4$ on the phenyl group.

According to one embodiment, in formula (I), $R_5$ et $R_6$ represent a methyl group.

According to one embodiment, in formula (I), $R_7$, $R_8$ and $R_9$ represent an ethyl group.

Among the compounds of the invention, mention may be made, in particular, of the compounds corresponding to the following formula (I-1):

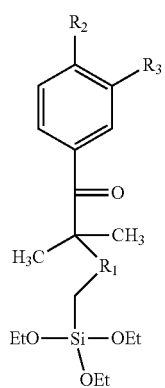

(I-1)

in which: $R_1$, $R_2$ and $R_3$ are as defined above in formula (I).

Preferably, in formula (I) or (I-1), $R_1$ represents an alkylene group, preferably a $C_2H_4$ group.

Preferably, in formula (I) or (I-1), $R_2$ and $R_3$ represent H.

According to one embodiment, in formula (I) or (I-1), $R_2$ represents H, while $R_3$ represents an $OR_a$ group as defined above, preferably OMe.

According to one embodiment, in formula (I) or (I-1), $R_2$ and $R_3$ together form a phenyl with the two carbon atoms which carry them.

Among the preferred compounds according to the invention, mention may be made of the compounds of the following formulas:

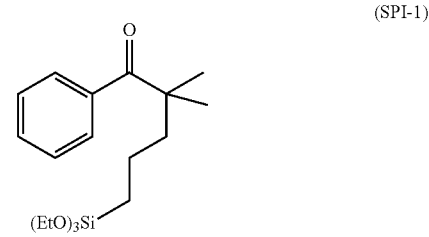

(SPI-1)

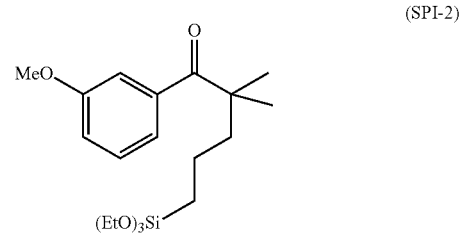

(SPI-2)

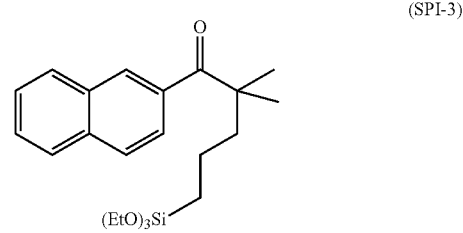

(SPI-3)

The present invention also relates to a process for the preparation of a compound of formula (I) as defined above, comprising the following steps:

the reaction of a compound of formula (II) below:

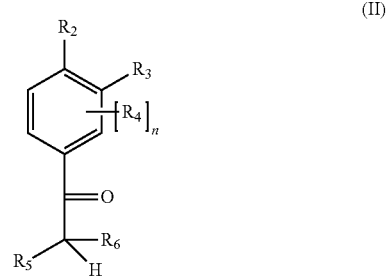

(II)

in which n, $R_2$, $R_3$, $R_4$, $R_5$ and $R_6$ are as defined above for formula (I);

with a compound of formula (III) $CH_2$=CH-$A_1$-X,

X representing a halogen atom such as I or Br, $A_1$ representing an alkylene radical comprising from 1 to 5 carbon atoms, and preferably being $CH_2$;

to obtain a compound of the following formula (IV):

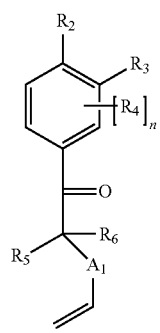

and the reaction of the compound of formula (IV) with a compound of formula (V) below:

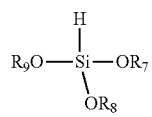

wherein $R_7$, $R_8$ and $R_9$ are as defined above.

Preferably, the step of preparing the compound of formula (IV) is carried out at a temperature between 80° C. and 100° C.

The present invention also relates to the use as a photoinitiator of a compound of formulas (I) or (I-1) as defined above.

Therefore, these compounds are used as a photoinitiator in photopolymerization processes, consisting, in particular, in polymerizing at least one monomer in the presence of at least one compound according to the invention, so as to obtain a hybrid polymer/filler material (the filler corresponding to the compound according to the invention).

The compounds according to the invention may be used as a photopolymerization filler for various fields of application: dental pastes, inks, 3D printing, or even for the manufacture of micro-objects, based on hybrid polymer/oxide materials.

They may also be used for medical or mechanical applications, or, in particular, for the manufacture of tools.

The present invention also relates to the use of a compound of formula (I) or (I-1) as defined above, for modifying a silica surface.

In particular, these compounds may be used to graft silica nanoparticles, or even zeolites and other oxides having accessible OH groups (SiOH, TiOH, AlOH, etc.).

The novel structure of the compounds according to the invention achieves two objectives: (i) hydrophobization of the silica surface (hydrophilic) that is necessary for better dispersion of these particles in the hydrophobic polymer matrix, and (ii) the chemical bonding between these particles and the polymers. As a result, it offers significant stability to the silica nanoparticles encapsulated in the polymer matrix, while improving the chemical and/or mechanical properties of the hybrid materials.

The present invention also relates to a method for modifying a silica surface comprising the following steps:

the bringing into contact of a silica surface comprising free Si—OH groups with at least one compound of formula (I) as defined above, so as to obtain a silica surface grafted with groups of the following formula (VI):

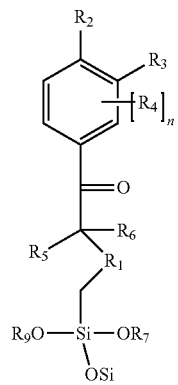

in which n, $R_2$, $R_3$, $R_4$, $R_5$, $R_6$, $R_7$ and $R_9$ are as defined above for formula (I); and the photopolymerization of the grafted silica surface obtained in the previous step with at least one monomer M, to obtain a modified silica surface comprising at least one group of the following formula (VII):

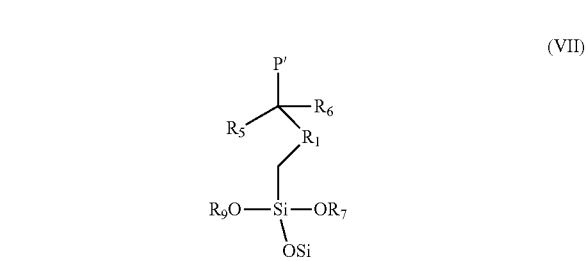

in which:
$R_1$, $R_5$, $R_6$, $R_7$ and $R_9$ are as defined above; and
P' is a polymer derived from the monomer M.

A wide range of radically polymerizable monomers may be considered, such as, for example, acrylic or vinyl monomers. The polymerization may be carried out in bulk (without a solvent) or in a dilute solution, under a controlled atmosphere and at room temperature.

The source of radiation depends on the chemical structure of the chromophore (benzoyl) which affects the absorbance of the compound. For example, for a structure with $R_2=R_3=R_4=H$, where irradiation with a lambda less than 320 nm is necessary.

The present invention also relates to a silica surface comprising at least one group of formula (VI) or (VII) as defined above.

The present invention also relates to silica nanoparticles, whose surface comprises at least one group of formula (VI) or (VII) as defined above.

The products thus obtained are hybrid or composite materials comprising a polymer in combination with grafted silica.

The mechanical hardness of such a material is much higher than that of the pure polymer, or of the polymer prepared with the ungrafted silica. Unlike similar products where the silane function is grafted onto the benzoyl group, in the compounds according to the invention, the silane function is grafted onto the other part of the compound, which allows, on the one hand, hanging the most effective radical on the surface, while, on the other hand, functionalizing the benzoyl group with other chromophores to obtain compounds with different UV-visible absorbance spectra.

FIGURES

FIG. 1 represents the organic matter content (estimated by thermogravimetric analysis) in silica samples grafted with: SPI-I (columns on the left), 3-methacryloxy propyltrimethoxysilane (MPTS) (98%) (columns in the center), and vinyl triethoxysilane (VTES) (columns on the right) after 5 minutes of photopolymerization of trimethylolpropane triacrylate (TMPTA) in the presence of silica suspension grafted with different silica/monomer ratios. In the case of MPTS and VTES, 1% by mass (relative to the amount of monomer) of an external photocell (isobutyrophenone; IBP) was used. After photopolymerization, the silica powders are collected by centrifugation, washed three times (with AcN)/EtOH/$H_2O$), and dried at 70° C. for more than 24 hours.

FIG. 2 represents HAADF-STEM images of a sample of SPI-1/silica after ex-situ photopolymerization of TMPTA/AcN (silica/monomer ratio 1:5 wt/wt). (a) The primary silica particles of 20-40 nm are visible (brilliant contrast), but are all strongly agglomerated and covered with amorphous organic matter (gray contrast). The amorphous gray contrast envelope surrounding the single silica nanoparticles is clearly distinguished in (b) and (c). The figure shows a homogeneous covering of the silica by the polymers.

EXAMPLES

Figure 1:
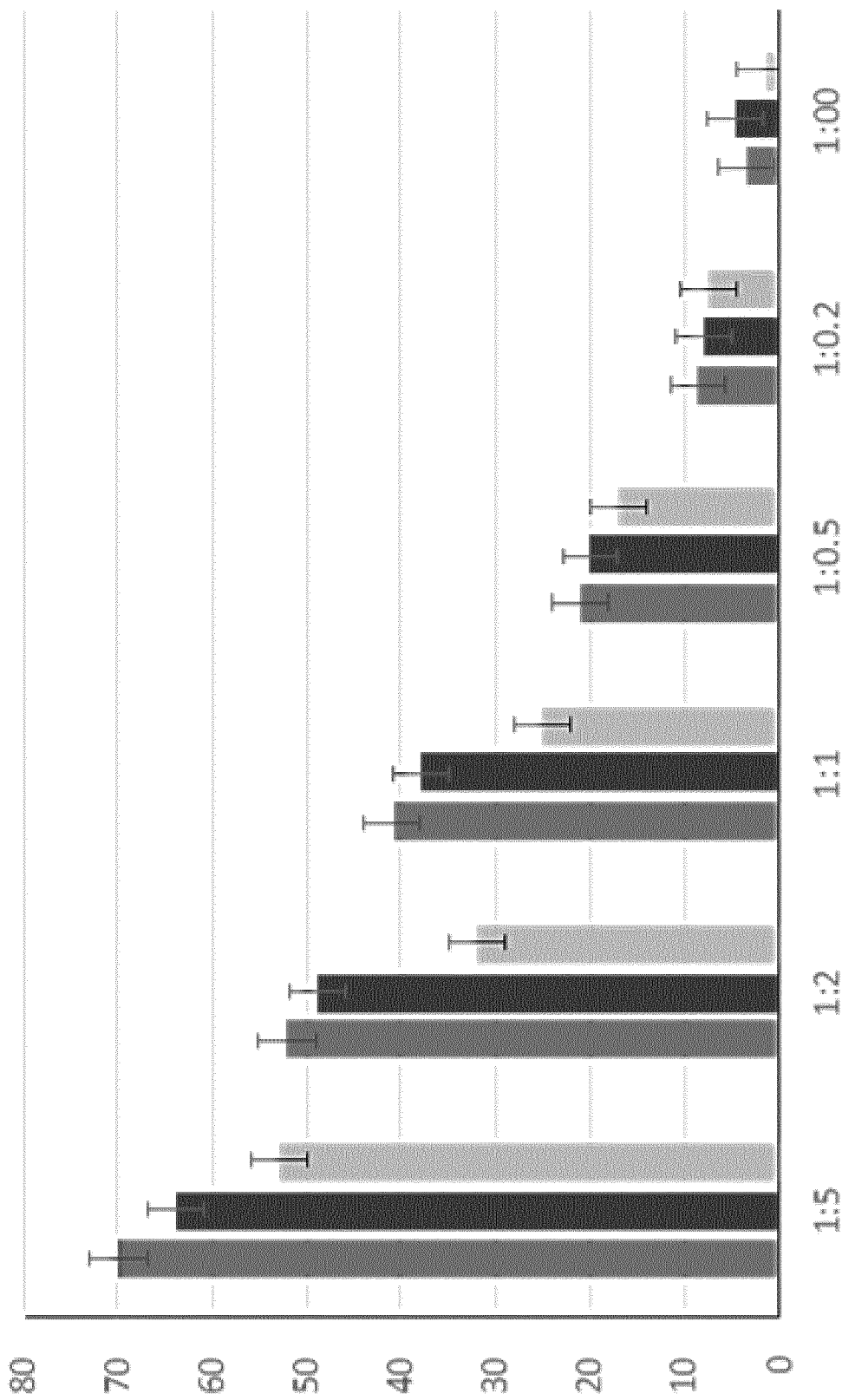

The reagents used hereinafter are obtained from Aldrich and without additional purification: isobutyrophenone (IBP) (97%), triethoxysilane (95%), trimethylolpropane triacrylate (TMPTA), ethyl vinyl ether (99%), 3-methacryloxy propyltrimethoxysilane (3-MPTS) (98%) and vinyl triethoxysilane (VTES) (97%).

Example 1: Preparation of a Photoinitiator According to the Invention

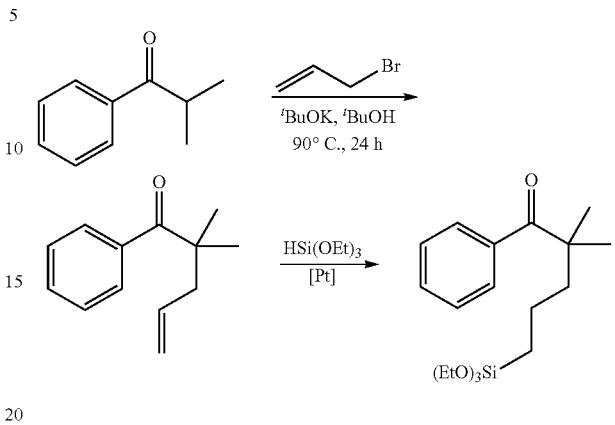

1. Synthesis of 2,2-Dimethyl-1-phenylpent-4-en-1-one 2.10 g of potassium tert-butoxide (18.70 mmol) was added to a solution of isobutyrophenone (2.02 ml, 17.00 mmol) in anhydrous tert-butanol (25.0 ml). The mixture is stirred at room temperature for 5 minutes. Then, 1.64 ml of allyl bromide (18.70 mmol) is added by syringe to the solution and the mixture is heated to 90° C. for 24 hours. After cooling, 5 ml of water are added and the product is extracted with diethyl ether $Et_2O$ (2×100 ml). The organic phases are then dried over magnesium sulfate and the solvent is evaporated in vacuo.

The $^1H$ proton NMR of the reaction mixture shows that the desired product is contaminated with approximately 10% of the starting product. Purification on a column on silica using a toluene/hexane mixture (1:1) provides the pure final product, with a yield of 94% (3.01 g; yield=94%) in the form of a colorless oil.

1H NMR (500 MHz, $CDCl_3$): 7.70-7.62 (m, 2H, ArH), 7.50-7.36 (m, 3H, ArH), 5.80-5.67 (m, 1H, HC=$CH_2$), 5.08-4.98 (m, 2H, HC=$CH_2$), 2.50 (dt, J=7.5 and 1.0 Hz, 2H, $CH_2$CH=$CH_2$), 1.33 (s, 6H, (CH3)2).

1. Summary of SPI-1

A solution of triethoxysilane (0.192 g; 1.17 mol) and 2,2-dimethyl-1-phenylpent-4-en-1-one (0.2 g; 1.06 mmol) is stirred without solvent in a tube sealed under an argon atmosphere, without prior purification.

A platinum on $Al_2O_3$ (5% by mass) was added to the solution and the tube was sealed and heated to 85° C. for 20 hours. After cooling to room temperature, the raw product is filtered on active carbon with anhydrous ethanol. The filtrate is concentrated and then dried under reduced pressure. The $^1H$ NMR analysis of the reaction mixture clearly shows the formation of the hydrosilylation product with conversions ranging from 40 to 62%. However, this adduct was found to be unstable on a column of silica or alumina, which made it impossible to obtain in pure form (the maximum degree of purity obtained being 82%). However, the residues do not contain the functional group necessary for grafting (EtOSi) and have no impact on this latter process. It should be noted that other methods of catalytic hydrosilylation, namely that recently reported by Chirik et al., were also tested and gave comparable results in terms of conversion (Schuster, C. H.; Diao, T.; Pappas, I.: Chirik, P J ACS Catal. 2016, 6, 2632).

$^1$H-NMR (500 MHz, $CDCl_3$): 6 0.13 (s, 3H, $CH_3$—Si); 0.63 (m, 2H, $SiCH_2$); 1.22 (t, 6H, J =7.1 Hz, $OCH_2CH_3$);

1.70 (m, 2H, SiCH$_2$CH$_2$CH$_2$); 2.05 (s, 3H, CH$_3$COO); 3.77 (q, 4H, J=7.1 Hz, OCH$_2$CH$_3$); 4.03 (t, 2H, J=7.0 Hz, SiCH$_2$CH$_2$CH$_2$).

$^{13}$C NMR (150 MHz, CDCl$_3$): δ 11.0; 18.21; 18.26; 26.1; 30.9; 44.5; 48.0; 58.3; 127.5; 128.0; 130.7; 139.2; 209.2.

The aforementioned SPI-2 and SPI-3 compounds were also prepared by applying the same protocol as that described in Example 1.

Example 2: Immobilization of SPI-1 on the Surface of Silica Nanoparticles

Ultrasil 7000 GR (Evonik) was used as the silica model, with a specific surface area of 175 m$^2$/g and a primary particle size of around 14 nm. The silica is first dried at 150° C. and 1 g is then dispersed in 20 ml of decane at 120° C. with vigorous stirring. After 10 min, 100 mg of SPI-1 is added and stirred continuously for 30 minutes. The product is then washed by centrifugation and dispersed in water/ethanol three times, then dried at 50° C. for 12 hours and stored at the end in the dark.

Characterizations through in-situ FTIR, NMR, UV-visible and thermogravimetry of the grafted silica confirm the grafting of SPI-1 on the surface, and show a 30% increase in the hydrophobicity of the silica after grafting and thermal stability up to 200° C. (FIGS. 3 to 8).

In particular, the characterizations by thermogravimetry (FIG. 5) show that the "SPI" coupling agents (compounds according to the invention) may also be grafted onto materials based on zeolite with a relatively high content. The mass contents of SPI on the zeolite are found respectively in the order of 8.0%, 8.3% and 7.5% for SPI-1, SPI-2 and SPI-3. The results demonstrate a relatively high thermal stability of the SPI structure (up to 250° C.).

Figure 6:
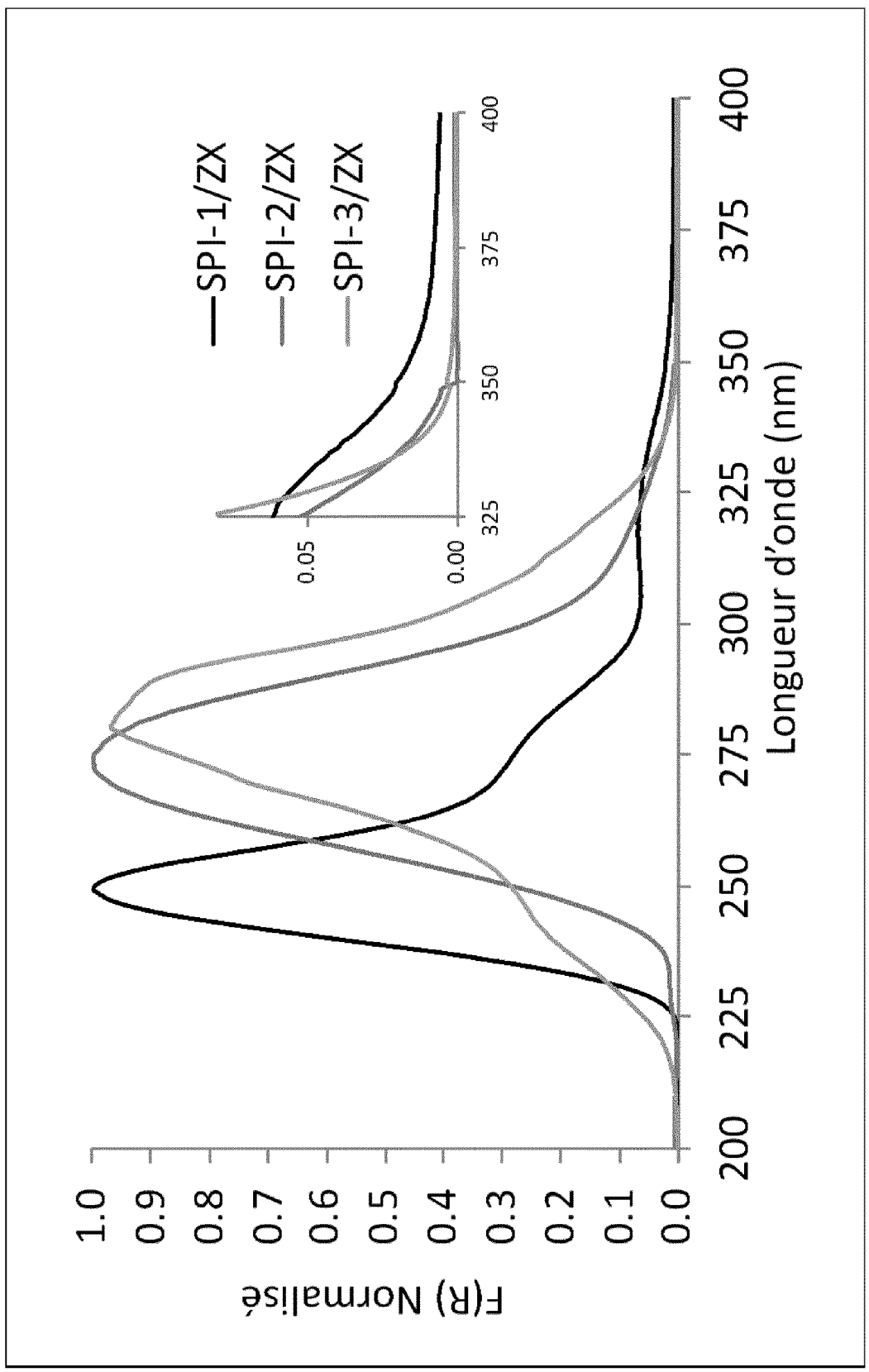
FIG. 6 represents the DR-UV-visible spectra of SPI-1, SPI-2 and SPI-3 grafted onto the zeolite (ZX).

The UV spectra of FIG. 6 show the stability of the structure after the grafting process on the zeolite and their absorbance in the solid state. The three structures have a different UV absorbance, which is useful and allows an increase in the choice of light sources used to initiate the photopolymerization.

Figure 7:
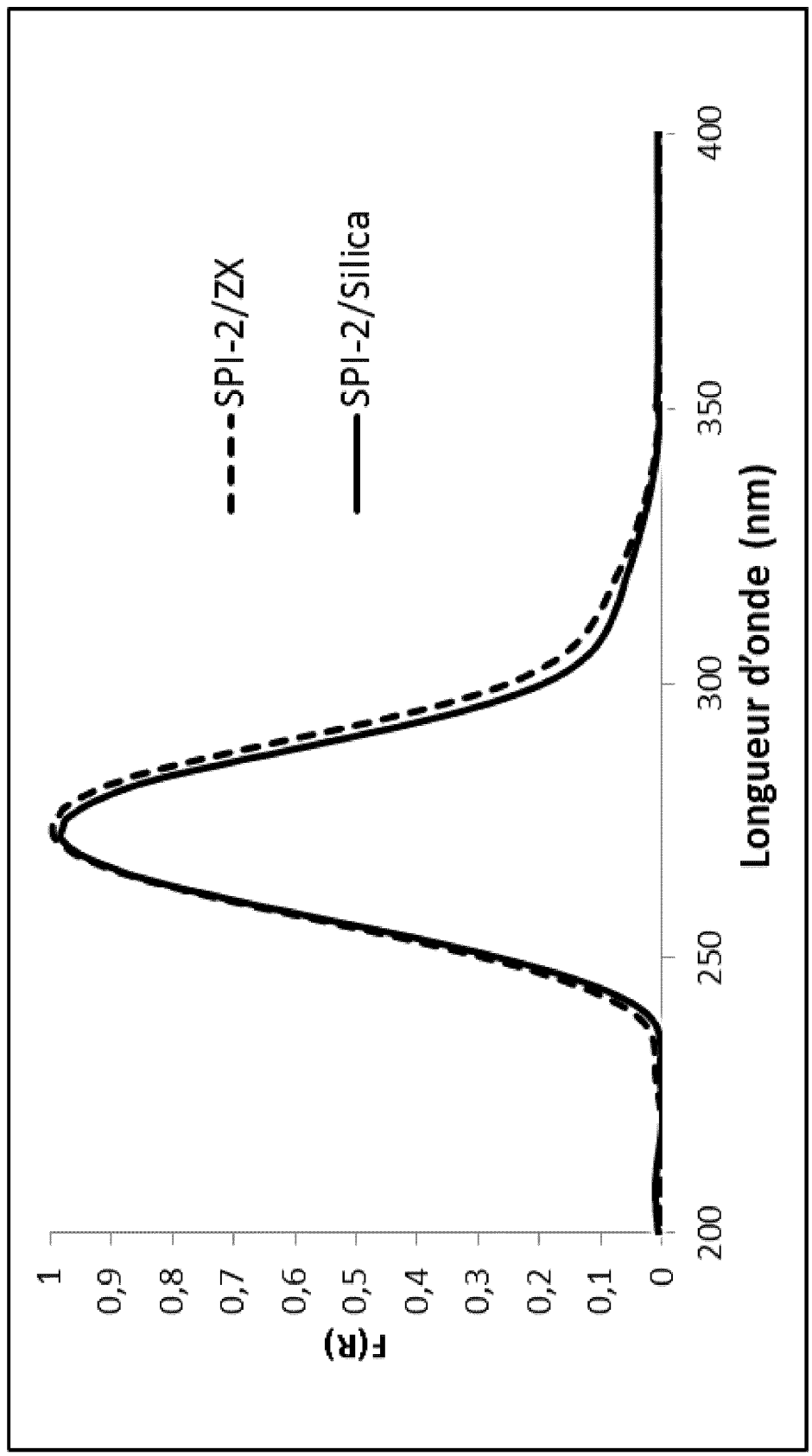
FIG. 7 represents the DR-UV-visible spectra of SPI-2 grafted on a zeolite (SPI-2/ZX) and on a silica (SPI-2/silica).
Figure 8:
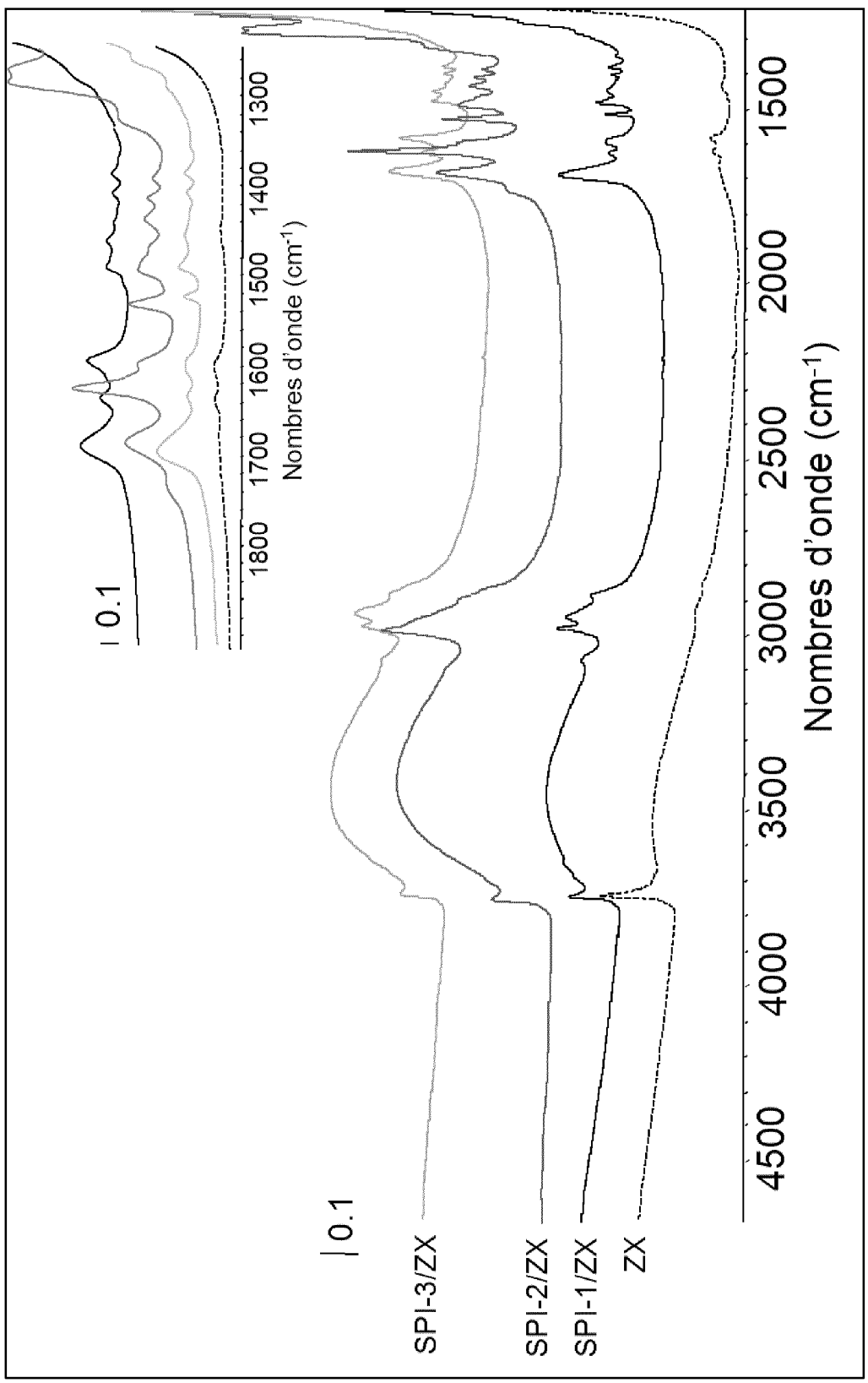
FIG. 8 represents the FTIR spectra of the zeolite samples (Faujasite X) (synthesized without an organic structuring agent) before grafting (ZX) and after grafting with SPI-1, SPI-2 and SPI-3 (degasification of the samples in in situ mode at 150° C. under vacuum ($10^{-6}$ torr)).
Figure 9:
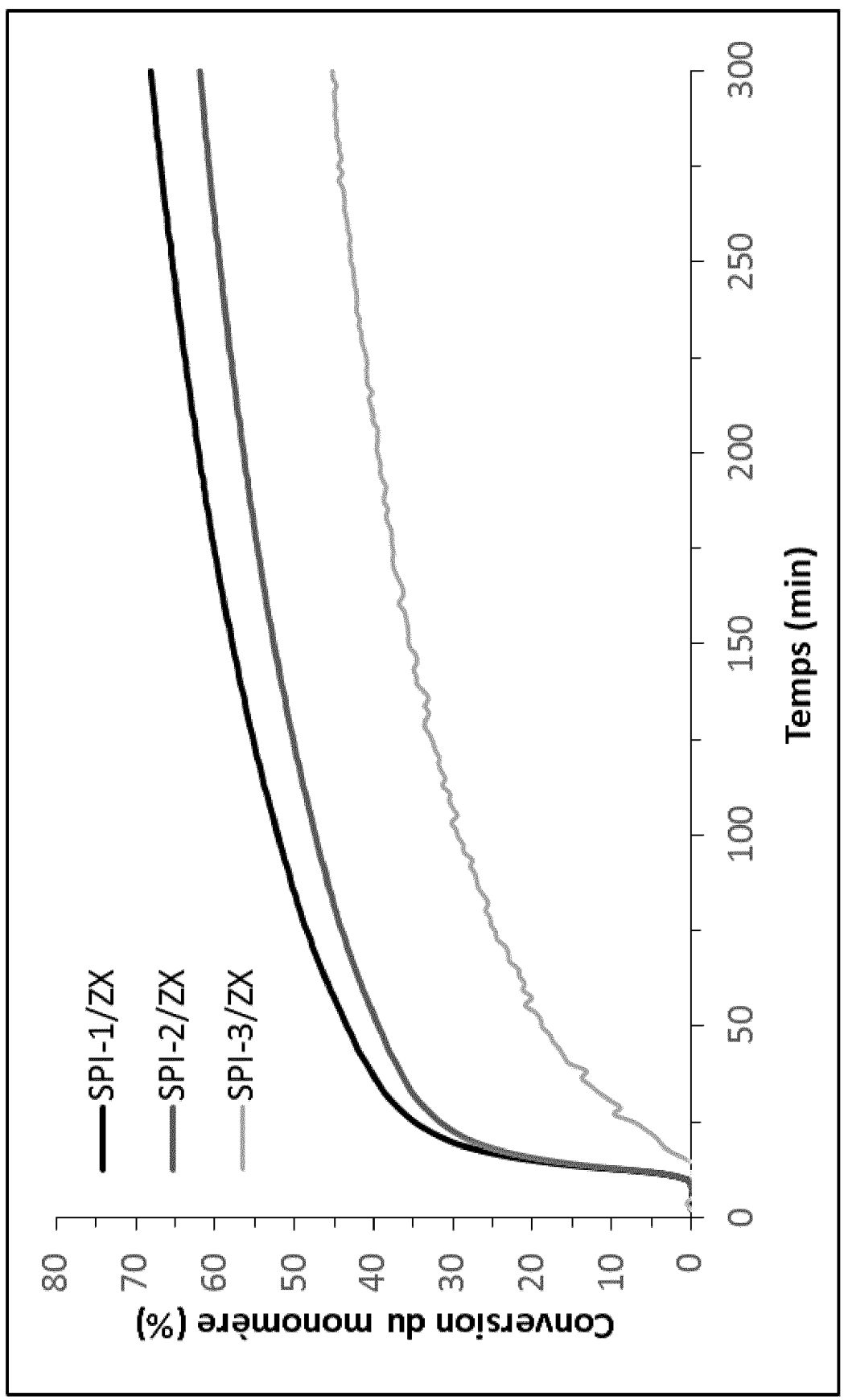
FIG. 9 represents the kinetics of the photopolymerization in situ of the TMPTA monomer in the presence of grafted zeolite (ZX) with SPI-1, SPI-2 and SPI-3 (10% by mass) under polychromatic UV irradiation (Hg-Xe lamp, Irradiance=150 mW/cm²) and under a controlled atmosphere (Ar).

The UV spectra of FIG. 7 show that the nature of the supports (for example zeolite or silica) has no influence on the absorbances of the SPI compounds.

EXAMPLE 3: Photopolymerization Tests

The grafted silica was tested via photopolymerization, in mass (without solvent) and in solution (acetonitrile), of an acrylic (TMPTA) and vinyl (VE) monomer in the absence of an external photoinitiator and under UV irradiation.

Figure 2:
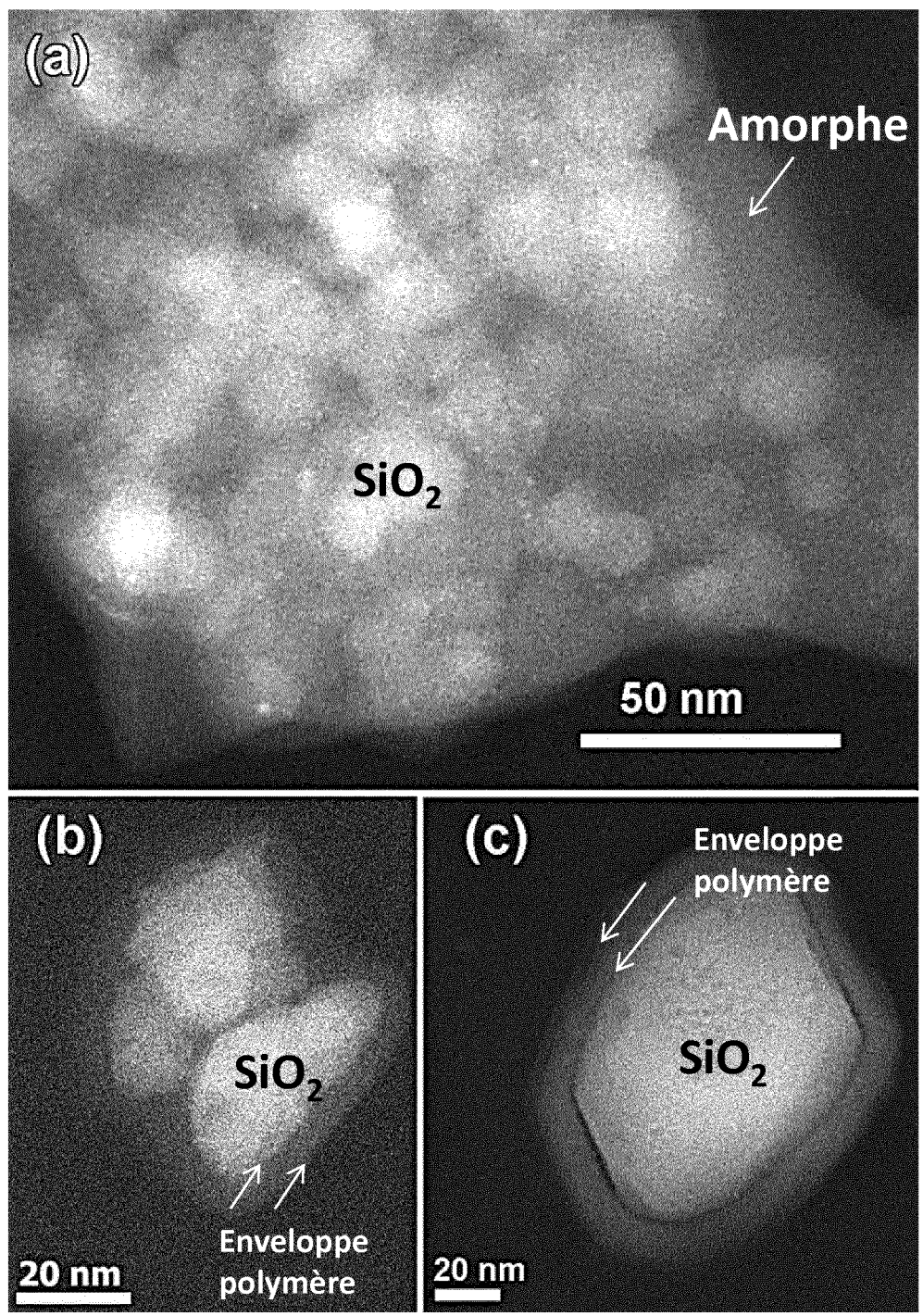
Figure 3:
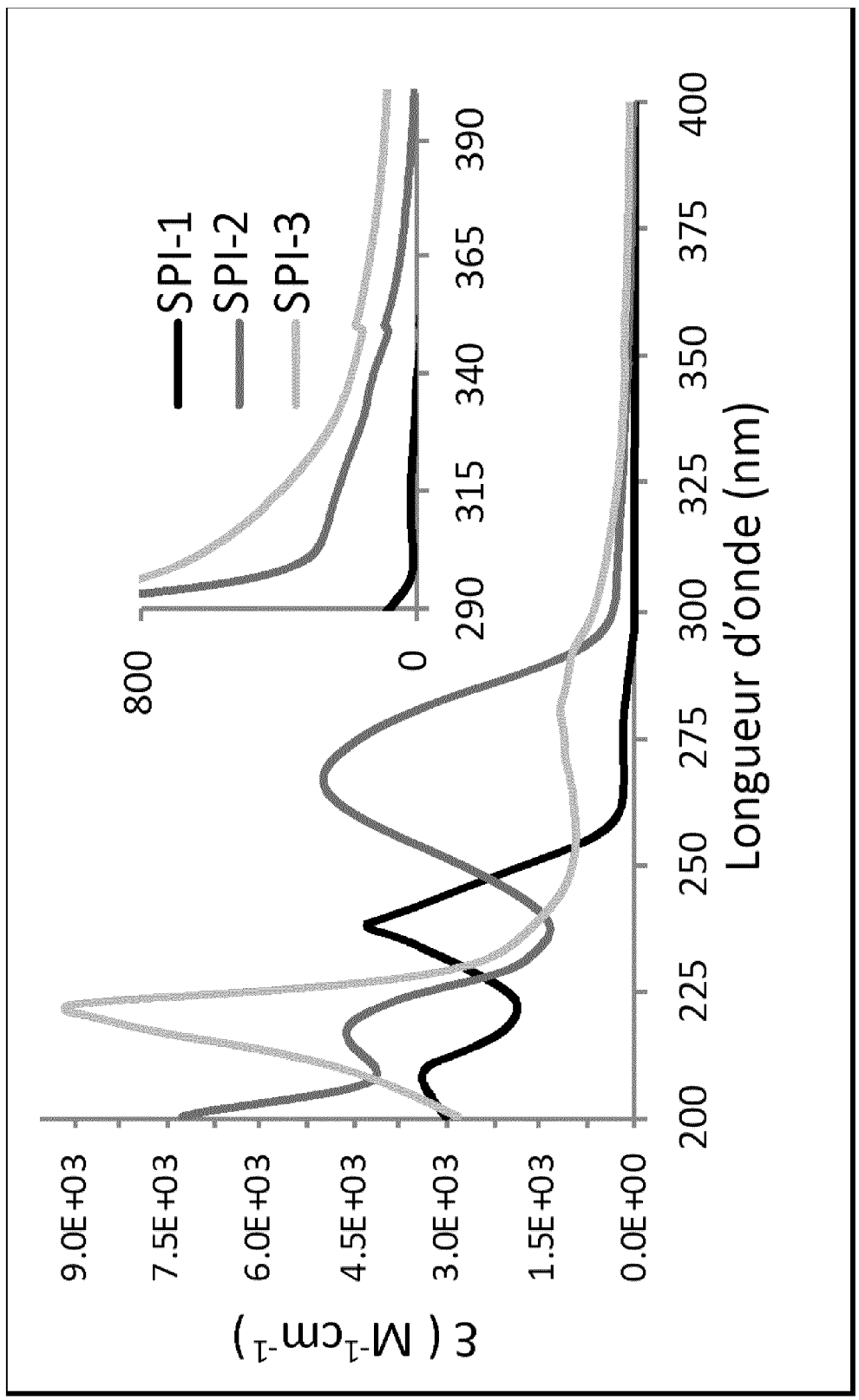
FIG. 3 represents the UV-visible spectra of SPI-1, SPI-2 and SPI-3 in acetonitrile. The insert in this figure shows a zoom on the absorbance of these compounds between 290 nm and 390 nm.
Figure 4:
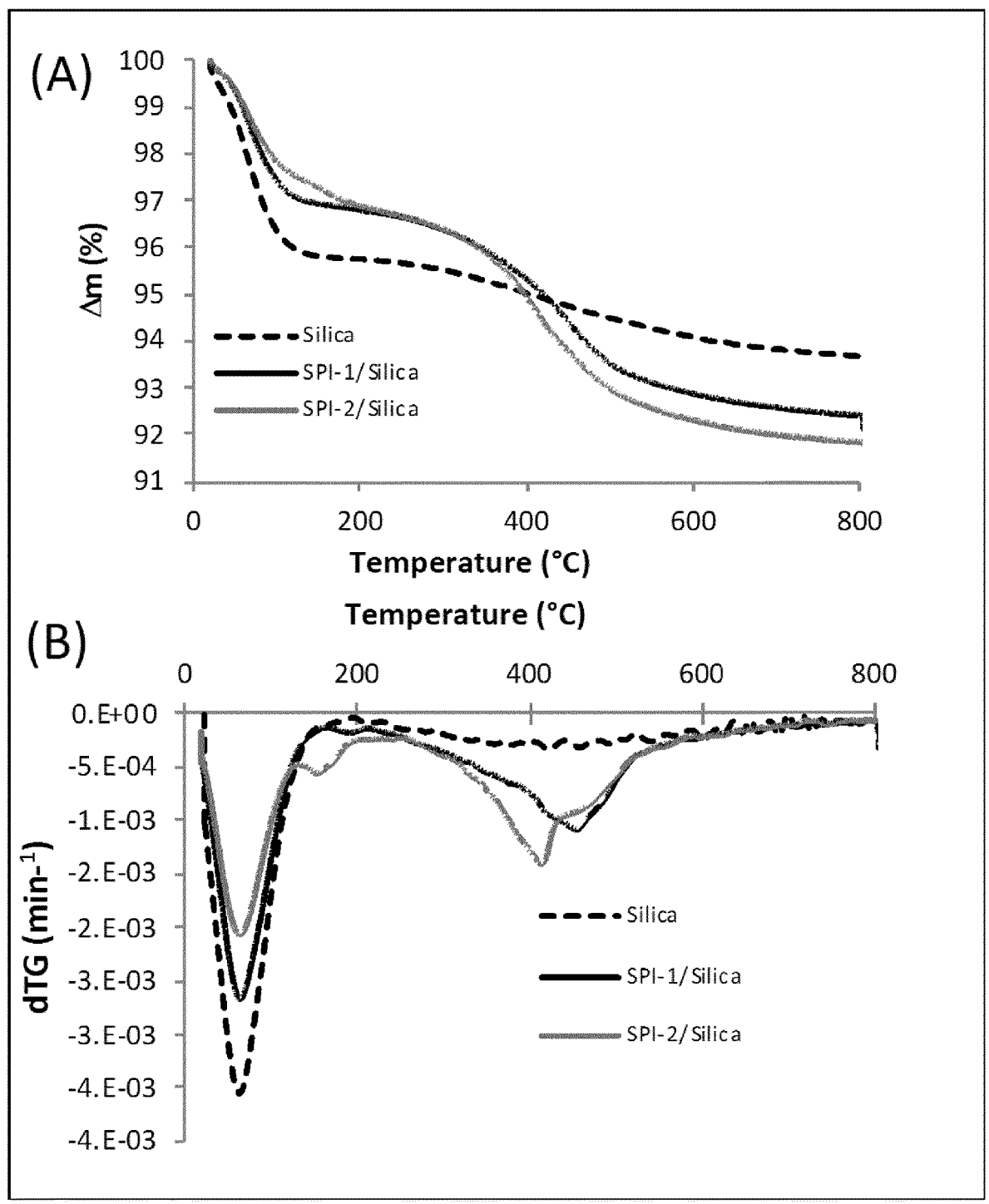
FIG. 4 represents the TG analysis of silica samples before (dotted curves) and after grafting with SPI-1 and SPI-2.
Figure 5:
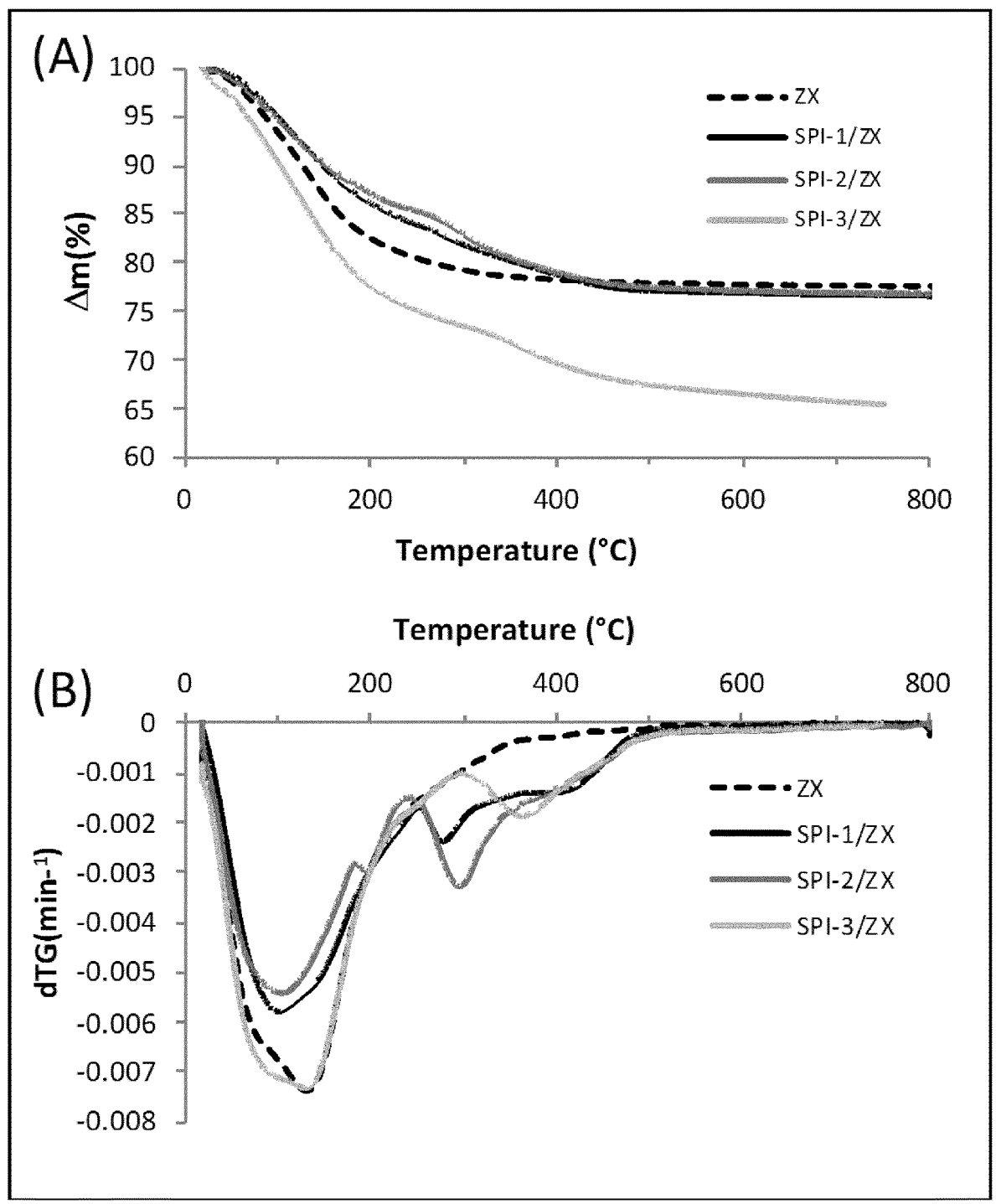
FIG. 5 represents the TG analysis of zeolite (Faujasite X) samples (prepared without organic structuring agents) before (dashed curves) and after grafting with SPI-1, SPI-2 and SPI-3.

The two monomers chosen respectively present a monomer poor and rich in electrons. The in-situ and ex-situ characterization of the product shows an interesting efficiency of the grafted silica in radical polymerization. Comparison with conventional systems (silicas grafted with monomers in which an external photoinitiator is used) shows a greater effectiveness of the new structure (FIG. 1). The difference is more significant for photopolymerization in solution (using a solvent) (FIG. 2). Unlike conventional systems, the SPI-1-silica product is non-selective with respect to the monomer used, so there is no need to modify/change the structure by changing the monomer. A significant improvement in the mechanical property (+180%), adhesion (−30%) and hydrophobicity (+−5-13%) was observed in comparison with the pure polymer or the composite prepared with the non-grafted silica.

The invention claimed is:

1. Compound of formula (I) below:

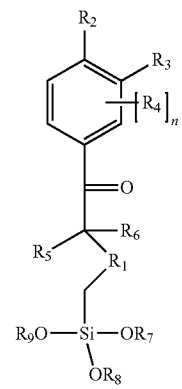

(I)

in which:

R$_1$ represents an alkylene group comprising from 1 to 6 carbon atoms or an —O-alkylene group comprising from 1 to 6 carbon atoms;

R$_2$ and R$_3$, identical or different, are chosen from the group consisting of: H, NO$_2$, OR$_a$, SR$_a$ and NR$_a$R$_b$, wherein R$_a$ and R$_b$, identical or different, represent H or an alkyl group comprising from 1 to 6 carbon atoms, or R$_2$ and R$_3$ may together form a phenyl group with the carbon atoms carrying them;

n is 0, 1, 2 or 3;

R$_4$ is chosen from the group consisting of: NO$_2$, OR$_a$, SR$_a$ and NR$_a$R$_b$, wherein R$_a$ and R$_b$ are as defined above;

R$_5$ and R$_6$, identical or different, represent an alkyl group comprising from 1 to 6 carbon atoms or an alkoxy group comprising from 1 to 6 carbon atoms; and R$_7$, R$_8$ and R$_9$, identical or different, represent an alkyl group comprising from 2 to 6 carbon atoms or an alkoxy group comprising from 2 to 6 carbon atoms.

2. A compound according to claim 1, wherein n=0.

3. A compound according to claim 1, wherein R$_5$ and R$_6$ represent a methyl group.

4. Compound according to claim 1, wherein R$_7$, R$_8$ and R$_9$ represent an ethyl group.

5. Compound according to claim 1, corresponding to the following formula (I-1):

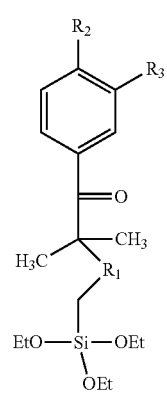

(I-1)

in which: R$_1$, R$_2$ and R$_3$ are as defined in claim 1.

6. Compound according to claim 1, wherein $R_1$ represents an alkylene group.

7. Compound according to claim 1, wherein $R_2$ and $R_3$ represent H.

8. Compound according to claim 1, wherein $R_2$ represents H, while $R_3$ represents an $OR_a$ group as defined in claim 1.

9. Compound according to claim 1, wherein $R_2$ and $R_3$ together form a phenyl group with the carbon atoms which carry them.

10. Process for the preparation of a compound of formula (I) according to claim 1, comprising:

the reaction of a compound of formula (II) below:

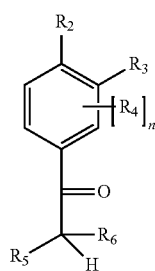

in which: n, $R_2$, $R_3$, $R_4$, $R_5$ and $R_6$ are as defined in claim 1;
with a compound of formula (III) $CH_2=CH-A_1-X$,
X representing a halogen atom such as I or Br,
$A_1$ representing an alkylene radical comprising from 1 to 5 carbon atoms;
to obtain a compound of the following formula (IV):

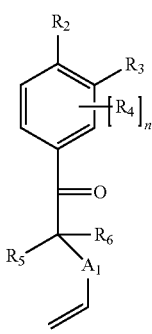

and the reaction of the compound of formula (IV) with a compound of formula (V) below:

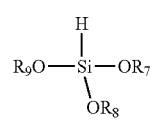

in which: $R_7$, $R_8$ and $R_9$ are as defined in claim 1.

11. Use of a compound of formula (I) according to claim 1 as a photoinitiator.

12. Use of a compound of formula (I) according to claim 1 to modify a silica surface.

13. Process for modifying a silica surface comprising:

bringing together a silica surface comprising free Si—OH groups with at least one compound of formula (I) according to claim 1, to obtain a silica surface grafted with groups of the following formula (VI) below:

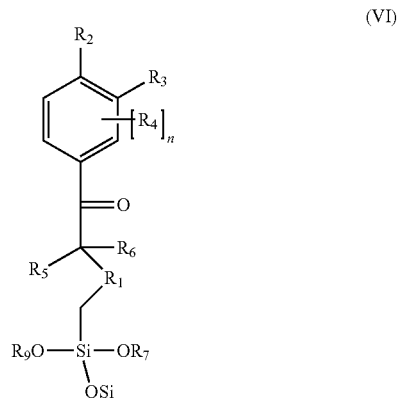

in which: n, $R_2$, $R_3$, $R_4$, $R_5$, $R_6$, $R_7$ and $R_9$ are as defined in claim 1; and photopolymerization of the grafted silica surface obtained in the previous step with at least one monomer M, to obtain a modified silica surface comprising at least one group of formula (VII) below:

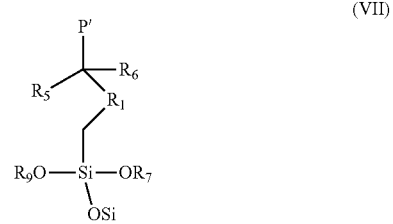

in which:

$R_1$, $R_5$, $R_6$, $R_7$ and $R_9$ are as defined in claim 1; and

P' is a polymer derived from the monomer M.

14. Silica surface comprising at least one group of formula (VI) or (VII) as defined in claim 13.

* * * * *